Feb. 23, 1926.
M. B. McGRAW
1,574,400
WINDSHIELD
Filed April 14, 1922
Fig. 1.
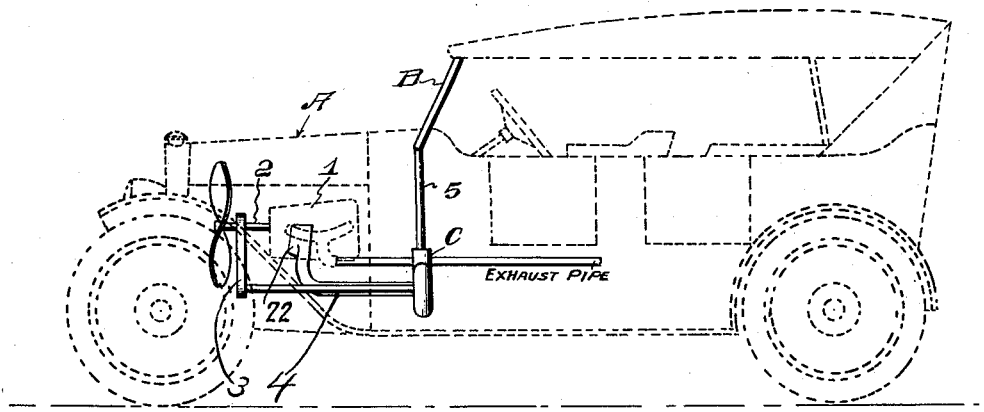
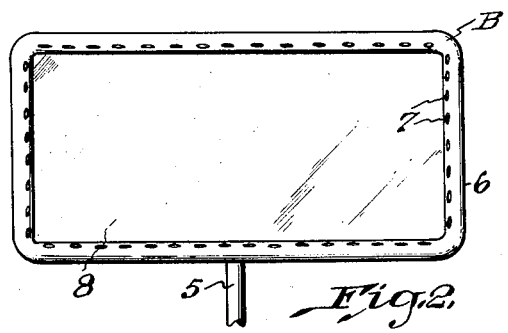
Fig. 2.
Fig. 3.
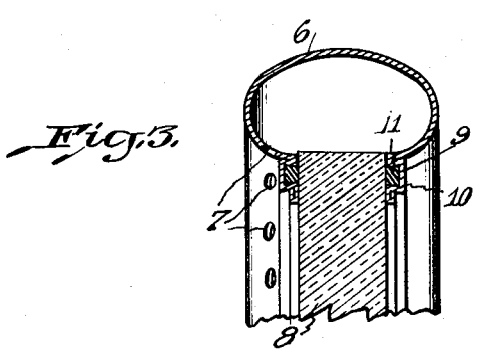
Martin B. McGraw
Inventor:

Patented Feb. 23, 1926.

1,574,400

UNITED STATES PATENT OFFICE.

MARTIN B. McGRAW, OF BEAVER FALLS, PENNSYLVANIA.

WINDSHIELD.

Application filed April 14, 1922. Serial No. 552,623.

*To all whom it may concern:*

Be it known that I, MARTIN B. McGRAW, a citizen of the United States, residing at Beaver Falls, in the county of Beaver and State of Pennsylvania, have invented certain new and useful Improvements in Windshields, of which the following is a specification.

This application is for matter shown in my application No. 414,687, filed Oct. 4, 1920.

The object of the invention is to provide a windshield which will be kept free and clear of all dust, snow, rain or other flying particles which might collect upon it and thereby obstruct the vision of the driver. Many devices have been provided for the purpose of cleaning windshields at intervals in order that the driver may be able to see clearly even though driving in a storm. I accomplish the same result by preventing the rain, snow or the like from alighting on the glass, or if it has alighted by removing it. The utility of my device is not confined to windshields. The principle of the invention may be made use of wherever it is desired to protect a transparent member from obstruction.

The drawing illustrates the preferred embodiment of the invention.

Figure 1 is a diagrammatic side elevation of a conventional type of automobile with my device applied thereto.

Figure 2 is a front elevation of my windshield.

Figure 3 is a transverse section through the frame thereof showing the manner of securing the glass in the frame.

A represents a conventional type of automobile provided with my improved windshield B. The frame of my windshield is constituted by a tubular member 6 having spaced, inwardly extending flanges 9 provided with continuous grooves or pockets 10 in which the gaskets 11, of rubber or analogous material, are securely seated. The edge portions of the glass extend between the projecting flanges 9 and are firmly gripped thereby. The gaskets 11 serve to cushion the glass and to form a joint between the glass and the tube which will be air-tight and water-tight. It will be noted that the tubular member 6 is provided adjacent the forward grooves 10 with a series of equidistant apertures 7 for a purpose to be later stated.

The lower portion of the tubular frame is connected to an air-pump C by means of a tube 5. The air-pump is driven from a shaft 4 which is driven by belt 3 from the usual fan shaft 2 of the motor 1. It will thus be seen that as long as the engine is in operation the pump will be continuously driven and will force the air through the tube 5 and into the tubular frame of the windshield. Here the air will be projected with considerable force through the relatively small apertures 7 and will form a screen or curtain of air which will effectively prevent flying particles of snow, or rain, or particles of dust from striking the windshield. Should any particles nevertheless alight upon the windshield, as when the vehicle is parked for a period of time, the jets of air will also serve to clear the windshield of such obstructions.

It will be noted that the greater the velocity of the vehicle and therefore the greater the relative velocity of the flying particles, the greater will be the velocity of the air shot from the apertures 7. Thus the device is effective at even the highest speeds.

If desired, the glass of the windshield may be removed and the curtain of air will be found to effectually shield the occupants from flying particles.

My device may be used on windows for locomotive cabs, on railway and street car windows and for the protection of show windows. When used for the last named purpose, the air supplied the pump should be heated by contact with a suitable heating surface. I do not desire to limit myself to the specific use illustrated but intend to cover all fair equivalents of the following claims.

I claim:

1. In a protecting device a hollow frame member adapted to receive a pane of glass and provided with a series of symmetrically arranged apertures, and means for supplying the frame member with air under pressure, said air passing outwardly through said apertures.

2. A windshield comprising a tubular frame member, transparent material secured therein, and means for supplying the frame member with air under pressure, said frame member being so formed and arranged as to direct the ejection of a protecting curtain of air in front of the windshield.

3. A frame member of substantially tubular shape in cross-section provided with integral parallel flanges adapted to clamp a sheet of transparent material therebetween, said member being provided with spaced apertures adjacent one of the flanges.

4. In a motor vehicle, a windshield comprising a frame member adapted to project therefrom a protecting current of air and means for supplying the frame member with air under pressure comprising an air-pump, connections between the pump and the frame member, and means for driving the pump from the usual automobile engine.

5. A windshield frame of sheet metal tubing, slotted to receive and clamp a sheet of glass therein, and means for sealing the joint between the glass and the frame, the tubing being provided with openings adjacent to the slot for the passage of gas under pressure therefrom.

6. In a protecting device, a hollow frame member adapted to receive a pane of glass, means for supplying the frame member with air under pressure, and said frame member being apertured so as to direct the air across the glass, whereby the moving air serves to shield and cleanse the latter.

7. A hollow frame, a pane of transparent material adapted to be recived and supported in said frame, and means for supplying the interior of said frame with a forced circulation of heated gas in direct contact with the walls of said frame.

8. A hollow frame member, a pane of transparent material received and supported in said member, means for supplying the said frame member with heated air under pressure, said frame member being apertured so as to project the heated air therefrom in such direction as to shield the pane from flying particles of dust and to remove such particles therefrom.

MARTIN B. McGRAW.